United States Patent
Patel et al.

(10) Patent No.: US 9,543,876 B2
(45) Date of Patent: Jan. 10, 2017

(54) THREE PHASE FLUX SWITCHING GENERATOR IN A THREE STAGE WOUND FIELD SYNCHRONOUS MACHINE

(71) Applicant: Hamilton Sundstrand Corporation, Charlotte, NC (US)

(72) Inventors: Dhaval Patel, Loves Park, IL (US);
David A. Fox, Rockford, IL (US);
Jason A. Ohnemus, Rockford, IL (US);
Albert L. Markunas, Roscoe, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 429 days.

(21) Appl. No.: 13/922,853

(22) Filed: Jun. 20, 2013

(65) Prior Publication Data
US 2015/0097372 A1    Apr. 9, 2015

(51) Int. Cl.
| F02N 11/04 | (2006.01) |
| H02K 23/52 | (2006.01) |
| H02P 25/02 | (2016.01) |
| H02P 1/16 | (2006.01) |
| H02P 6/18 | (2016.01) |
| F02C 7/275 | (2006.01) |
| H02K 19/12 | (2006.01) |
| H02K 19/28 | (2006.01) |

(52) U.S. Cl.
CPC ............. *H02P 25/026* (2013.01); *F02C 7/275* (2013.01); *H02K 19/12* (2013.01); *H02K 19/28* (2013.01); *H02P 1/16* (2013.01); *H02P 6/18* (2013.01); *H02P 6/186* (2013.01); *H02P 25/03* (2016.02); *Y02T 50/671* (2013.01)

(58) Field of Classification Search
CPC ........ H02P 25/026; H02P 25/03; H02K 19/12; H02K 19/26
USPC ............................................... 290/31, 44, 55
See application file for complete search history.

(56) References Cited

U.S. PATENT DOCUMENTS

| 7,583,046 B2 | 9/2009 | Maddali et al. | |
| 2008/0315822 A1 | 12/2008 | Maddali et al. | |
| 2011/0260672 A1* | 10/2011 | Ramu | H02K 21/44 318/701 |
| 2011/0316366 A1* | 12/2011 | Abbasian | H02K 16/04 310/46 |
| 2012/0062161 A1 | 3/2012 | Patel et al. | |

OTHER PUBLICATIONS

C.Wang, "Three-phase flux reversal machine (FRM)", Mar. 1999, IEEE Prc.-Electr. Power Appl. vol. 146 No. 2, pp. 139-146.*

(Continued)

*Primary Examiner* — Tulsidas C Patel
*Assistant Examiner* — Thomas Quigley
(74) *Attorney, Agent, or Firm* — Cantor Colburn LLP

(57) ABSTRACT

A brushless, three phase wound field synchronous machine (WFSM) provides an electromechanical power transfer system wherein it may serve as both a starter and a generator. Power for the excitation system of the WFSM is provided by a three phase flux switching generator (FSG). The three phase FSG also provides position sensor functionality for the WFSM when the WFSM operates in the starter/motor mode.

16 Claims, 3 Drawing Sheets

(56) References Cited

OTHER PUBLICATIONS

A. Chen, et al., "Investigation of a Three-Phase Flux-Switching Permanent Magnet Machine for Downhole Applications," in the Proceedings of ICEM 2012, Rome, 2010. pp. 1-5.
Z. Zhu, et al., "Advanced Flux-Switching Permanent Magnet Brushless Machines," in IEEE Transactions on Magnetics, vol. 46, Issue 6, Jun. 2010; pp. 1447-1453.
European Search Report for International Application No. 14173215.6-1806 issued Aug. 18, 2015. (9 pgs).
Fang et al., "Design and Analysis of a Novel Flux-Switching Permanent Magnet Integrated-Stranger-Generation." 4th IET International Conference on Power Electronics, Machines and Drives. (2008) 5 pgs.
Wang et al., "A Position Sensorless Method for Direct Torgue COntrol With Space Vector Modultaion of Hybrid Excitation Flux-Switching Generator." IEEE Transactions on Energy Conversion IEEE Service Center, vol. 27, No. 4 (2012). 10 pgs.
Zhu et al., "Analysis of Electromagnetic Performance of Flux-Switching Permanent-Magnet Machines by Nonlinear Adaptive Lumped Parameter Magnetic Circuit Model." IEEE Transactions on Magnetics, vol. 41, No. 11 Nov. 2005 (11 pgs).

\* cited by examiner

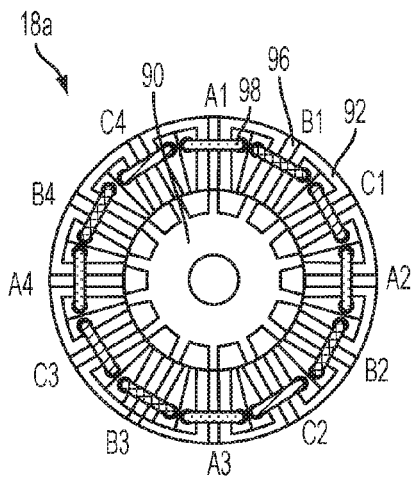
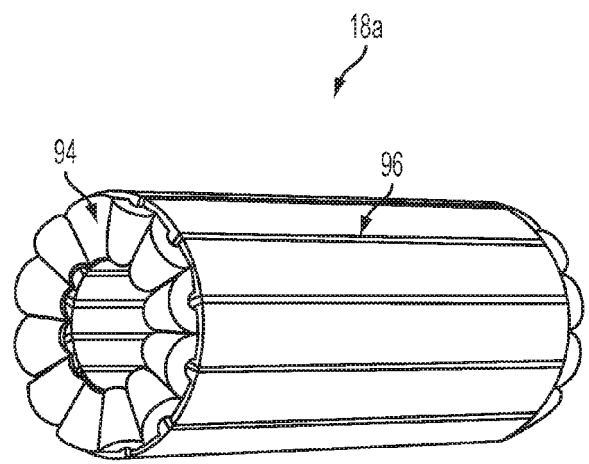
FIG. 3A  FIG. 3B
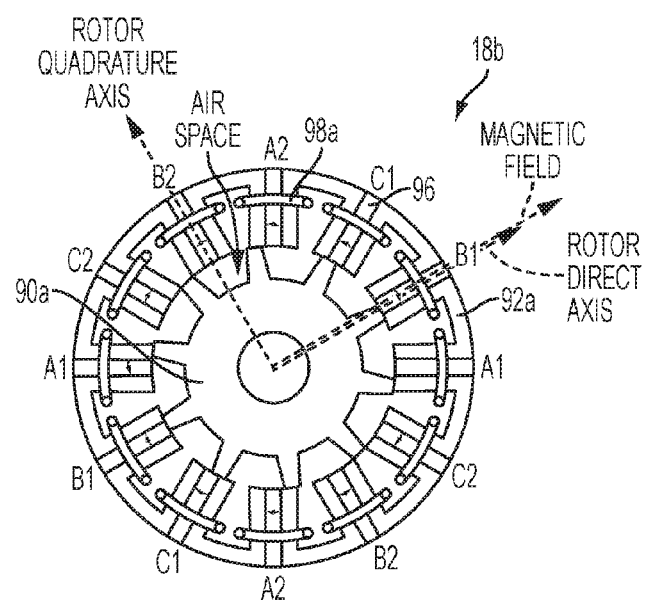
FIG. 4

THREE PHASE FLUX SWITCHING GENERATOR IN A THREE STAGE WOUND FIELD SYNCHRONOUS MACHINE

FIELD OF DISCLOSURE

The subject matter disclosed herein relates to wound field synchronous machines (WFSM) used as both a starter and a generator in aeronautical applications. More specifically, the subject disclosure relates to the permanent magnet generator (PMG) component of a WFSM.

BACKGROUND

Electromechanical power transfer systems for aeronautical applications may integrate main and auxiliary engine start functions with onboard electric power generating equipment. A conventional brushless, WFSM is ideal for such an electromechanical power transfer system wherein it may serve as both a starter and a generator. It is a logical choice for modern variable frequency (VF) alternating current (AC) electric system architectures. A WFSM that serves as both a starter and a generator is representative of a class of variable speed motor drives in the start mode of operation that uses a solid-state power converter to process typically high potential direct current (DC) electric power into VF AC electric power suitable for driving the variable speed AC electric machine.

Aeronautical applications typically use a brushless WFSM, which is actually three electric machines using a common shaft in the same housing. The three electric machines typically include a permanent magnetic generator (PMG), an exciter and a main machine (MM). The common shaft functions as a rotor that turns inside various sets of stator windings. In some applications, the PMG is installed on another shaft that is geared to the main shaft containing the exciter and MM. The rotor may be turned by an engine or a gear box or a gear train. The PMG portion of the WFSM is formed from a section of the rotor having permanent magnets in it and a stator with a three phase winding, thereby, as the rotor turns, the PMG generates AC power because the rotating magnets induce AC power in the stator. The exciter consists of a rotor with AC windings and a stator with windings. The stator can have DC windings set up in a salient pole configuration or AC windings setup in a three phase configuration similar to an induction machine. During starter/motor mode, the exciter stator is excited with AC power that can be sourced from the generator control unit (GCU) or an aircraft bus. If the GCU is sourcing the AC power, GCU power is sourced from the batteries, ground power or an existing aircraft bus. During generate mode, the GCU rectifies the AC power from the PMG to DC power for use in the GCU control circuits and provides MM excitation via a DC to DC converter. The GCU will source the exciter with DC power in order to excite the MM. When the exciter is energized, in both starter/motor and generate modes, the stator windings form magnetic north-south pole pairs. Because the exciter rotor windings are three phase, the output power generated is continuous three phase AC in both modes of operation. A rotating rectifier is often included to convert the exciter AC output to DC for presentation to the MM. The MM has a rotor with a DC winding and a stator with an AC winding. Thus, as the rotor rotates, it generates an electromotive force (EMF) and produces power.

As described previously, the WFSM may be operated in generate mode or a starter/motor mode. Operation of the WFSM in the starter/motor mode constitutes a variable speed motor drive utilizing a solid-state power converter to process typically high potential DC electric power to provide variable frequency AC power input to the WFSM. For operation of a WFSM as a variable speed motor drive it is necessary to know the rotational position of the WSFM main rotor to control the solid-state power converter to meet motor performance requirements. Previous systems used position sensors (e.g., resolvers) to determine rotor position at low speed. During high speed operation, any stage of the three stage WFSM can be utilized to determine rotor position. Some systems have now replaced resolvers by self sensing rotor position using one or more components of the WFSM for low speed operation. In order to replace the position sensor, the component used as a replacement to a position sensor must have persistent excitation and must have saliency. Saliency can be defined as the difference between the inductance in the rotor quadrature axis (Q axis) and the inductance in the rotor direct axes (D axis), and these inductance values are generally controlled by how much magnetic field flows through a certain area. Thus, saliency is the variance between Q axis inductance and D axis inductance. This variance imprints spatial harmonics onto the waveforms, which are rotor position dependent, allowing for position determination.

One known technique of estimating the position of components in the WFSM involves superimposing a carrier voltage signal upon a fundamental control voltage signal. A controller generates the fundamental control signal, which modulates an AC power source that drives the WFSM to produce rotational torque. As the carrier voltage signal is a relatively high-frequency signal, the carrier voltage signal does not substantially affect the fundamental control signal driving the motor. The technique of estimating the angular position of the rotor is often referred to as the carrier injection sensorless ("CIS") method and is described in U.S. Pat. No. 5,585,709, and the entire disclosure of this patent is incorporated herein by reference in its entirety.

The CIS method has proven useful but it has shortcomings. For example, the CIS method may undesirably place an increased current carrying burden on some components. Thus, other techniques have been developed, such as a technique that measures and utilizes current harmonics of a PMG rather than the current harmonics induced by a carrier voltage signal. An example of this technique is described in U.S. Pat. No. 8,362,728, and the entire disclosure of this patent is incorporated herein by reference in its entirety. In the example of the CIS technique, the PMG is excited with only the CIS signal because it is not utilized in starter mode, however the position sensing technique is consistent with CIS methods and is dependent on the PMG saliency.

In previous designs the PMG has consisted of a single phase flux switching generator (FSG) or a three phase PMG. For both designs, the PMG output is AC. The single phase FSG provides a simple construction. However, the obvious disadvantage of a single phase FSG is that it is single phase, so it does not produce continuous power when converted from AC to DC. As a result, the GCU must include a very large filter in comparison to a GCU sourced with three phase power. Additionally, the load regulation is very poor in the single phase system.

The three phase PMG typically consists of a stator with three phases and is a surface mounted permanent magnet rotor. The magnets are mounted onto a hub with a containment band installed around the outer diameter for magnet retention. Although three phase PMG's provide continuous 3 phase power to the GCU and reduce the size of the machine, its rotor magnets tend to be brittle and require careful handling during all piece part and next higher assembly phases. During assembly, the magnets can easily chip or crack leading to weak points and creating contamination in the machine. The operating speeds require a containment band to prevent the magnets from flying off the rotor. The containment band is non-magnetic (e.g., titanium, inconel) to reduce leakage inductance and losses. The bands are expensive and difficult to produce due to the hardness of the non-magnetic materials. Overall cost can be high due to the magnet material and the containment band material.

Also, three phase PMG's tend to be ineffective as sensors because the D and Q axes inductances are almost identical in surface mounted permanent magnet rotors. Without a clear difference and/or isolation of the D axis from the Q axis, it is difficult to precisely identify the rotor position. Self-sensing schemes for AC machines required saliency in order to determine rotor position.

SUMMARY

The disclosed embodiments include a WFSM having a generate mode and a starter mode, the WFSM comprising: a three phase FSG; an exciter coupled to said three phase FSG; and a main machine coupled to said exciter, wherein the WFSM comprises a variable input speed range and a variable frequency (VF) architecture.

The disclosed embodiments further include a WFSM having a generate mode and a starter mode, the WFSM comprising: a rotor position sensor comprising a three phase FSG; wherein said three phase FSG directs magnetic fields primarily through a direct axis (D axis), thereby substantially isolating a D axis inductance from a quadrature axis (Q axis) inductance.

The disclosed embodiments further include a WFSM having a generate mode and a starter mode, the WFSM comprising: means for generating three phase excitation power; means for generating electromotive force (EMF) in response to said excitation power; and means for inducing a voltage in response to said EMF; wherein the WFSM comprises a variable frequency (VF) architecture; and wherein a load coupled to said means for inducing draws a current.

The disclosed embodiments further include a method of operating a WFSM having a generate mode and a starter mode, the steps comprising: generating three phase excitation power; generating electromotive force (EMF) in response to said excitation power; and inducing a voltage in response to said EMF; wherein the WFSM comprises a variable frequency (VF) architecture; and wherein a load coupled to said voltage draws a current.

The disclosed embodiments further include a method of operating a WFSM having a generate mode and a starter mode, the steps comprising: sensing a position of a rotor of the WFSM; wherein said sensing step directs magnetic fields primarily through a D axis, thereby substantially isolating a D axis inductance from a Q axis inductance.

BRIEF DESCRIPTION OF THE DRAWINGS

The accompanying drawings are presented to aid in the description of embodiments of the invention and are provided solely for illustration of the embodiments and not limitation thereof.

FIGS. 3a and 3b illustrate example embodiments of the three phase flux switch generator (FSG) of FIG. 1; and FIG. 4 illustrates another example embodiment the three phase FSG of FIG. 1.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 1:
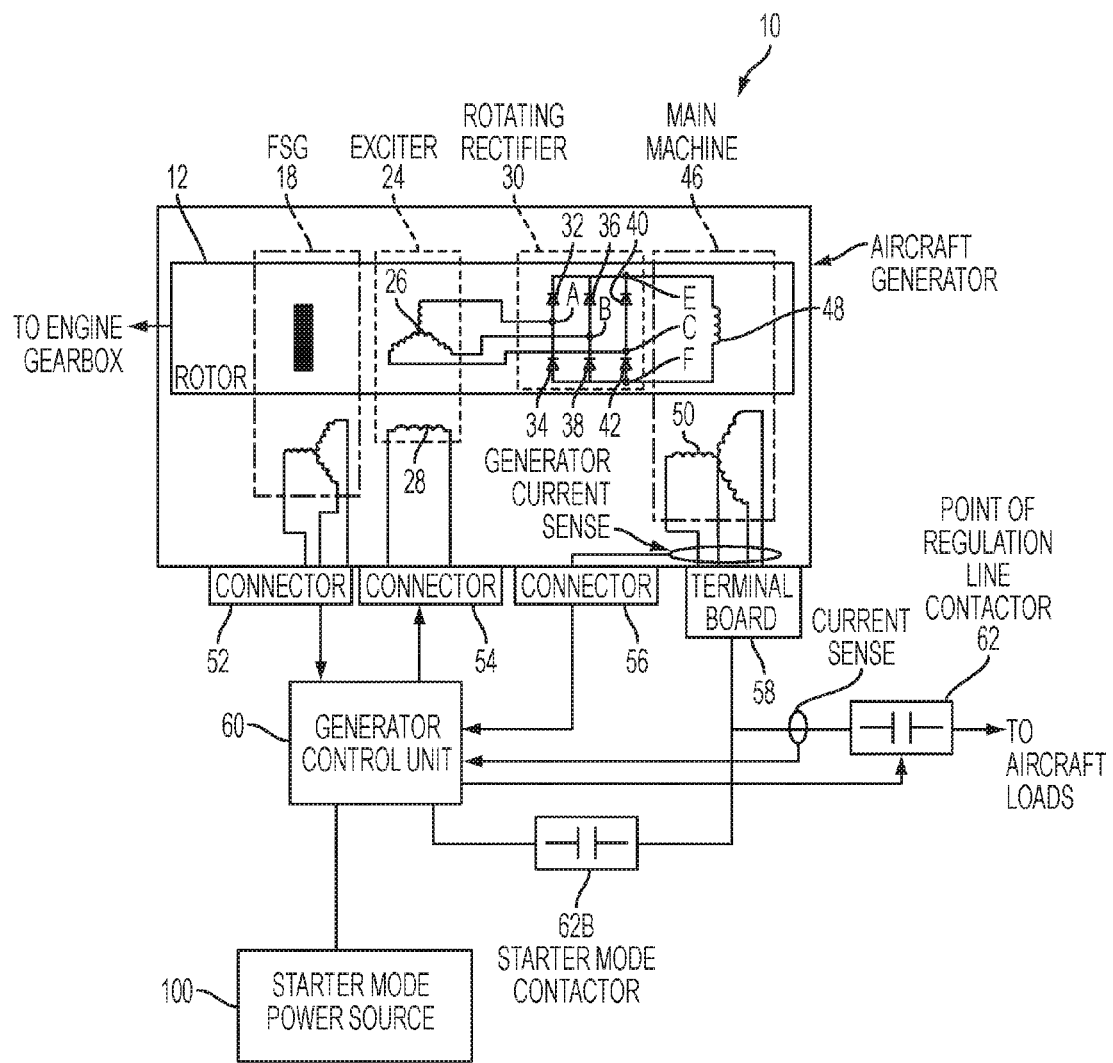
FIG. 1 is a partial schematic illustration of an electromechanical power transfer system, also known as a wound field synchronous machine (WFSM), of the disclosed embodiment.

FIG. 1 is a schematic diagram of a three stage wound field synchronous machine 10 of the disclosed embodiments. In general the three stage wound field synchronous machine 10 includes three electric machines that utilize a common shaft/rotor 12 in the same housing. The three electric machines include a three phase flux switching generator (FSG) 18, an exciter 24 and a main machine (MM) 46, all joined to the coupling shaft/rotor 12. Also provided are a rotating rectifier 30, various connectors 52, 54, 56, a terminal board 58, a GCU 60, starter mode power source 100, a point of regulation line contactor 62, and a starter mode contactor 62B. The coupling shaft 12 extends from the three phase FSG 18 to the MM portion 46. The illustrated arrangement of the MM 46, the exciter portion 24, and three phase FSG 18, and other components is shown for example only. Other arrangements are possible, including configurations wherein the three phase FSG 18 is connected via gears to the main shaft 12. As is known, the angular position of the rotor 12 is required to properly orient a current communicating to the MM 46 relative to the magnetic north pole of the rotor 12 during starter mode.

Referring still to FIG. 1, the example WFSM 10 is configured to drive a prime mover (not shown) by rotating a main shaft 12. Although this example shows the single main shaft 12, other examples may include additional shafts. The prime mover may include one or more gearboxes (not shown). In the example shown in FIG. 1, the prime mover is a gas turbine engine of an aircraft. In another example, the prime mover may be another type of device requiring rotation for operation.

The exciter 24 includes exciter rotor windings 26, 28 configured to have three phases for generating a three-phase AC voltage, which is supplied to input terminals A, B, and C of the rotating rectifier assembly 30. The rectifier circuit of rotating rectifier assembly 30 includes diodes 32, 34, 36, 38, 40 and 42 connected in a bridge configuration to input terminals A, B, and C to rectify the AC voltage from the exciter rotor windings 26 into a DC voltage across output terminals E and F. Rectifier circuits formed of pairs of diodes 32/34, 36/38, and 40/42 between output terminals E and F each connect to one phase of exciter rotor winding 26. For example, diodes 32 and 34 in series with one another form a rectifier circuit. MM 46 includes main rotor field winding 48 and is electrically connected between output terminals E and F for receipt of the DC voltage.

Figure 2:
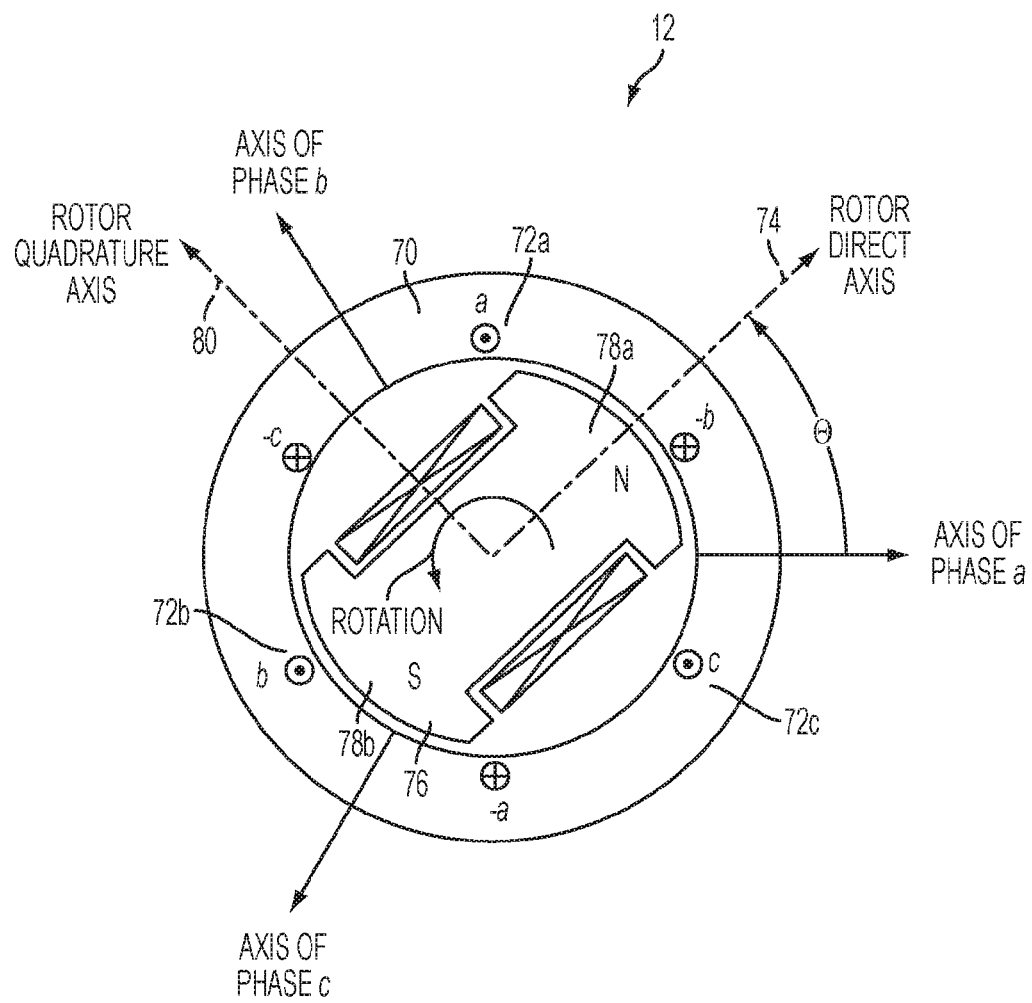
FIG. 2 illustrates an example WFSM including rotor saliency, and illustrates a direct (D) axis and a quadrature (Q) axis of the WFSM.

FIG. 2 illustrates cross section of an example of a 3-phase, 2-pole main machine having a rotor section 76 and a stator section 70, and including rotor saliency. The example stator 70 has a smooth magnetic structure with three phase windings 72a-c, represented as single windings. The rotor section 76 has two poles: one "north" pole 78a, and one "South" pole 78b. A direct rotor axis 74 is aligned with the rotor "North" pole and rotates with the rotor 76. A rotor quadrature axis (Q axis) 80 is centered in a rotor interpolar space and is displaced 90 degrees from the rotor section 76 in the 2-pole example of FIG. 2. The Q axis 80 also rotates with the rotor section 76 as shown in FIG. 2. As described previously, carrier injection sensorless (CIS) stimulation signals applied to the stator of a salient pole synchronous machine (e.g. the MM 46 of FIG. 1) or a three phase FSG 18 (shown in FIG. 1) determines position from the saliency that is dependent on rotor position created by the physical geometry of the rotor structure 76. This rotor saliency induced variable reluctance produces stator 70 currents at select harmonics of the CIS stimulation frequency that is a function of rotor position. Rotor saliency can be achieved by selecting a rotor section 76 that has a non-uniform geometry as illustrated in FIG. 2. Saliency can also be achieved by selecting stator geometry with non-uniform features; however this is more difficult due to winding requirements for three phase systems.

In accordance with the disclosed embodiments, FIGS. 3a, 3b and 4 illustrate examples of three phase FSG's 18a, 18b of the disclosed embodiments and capable of being implemented as the three phase FSG 18 of FIG. 1. The three phase flux switches 18a, 18b are PM machines comprising a passive and robust salient-pole rotor 90, 90a and a complex salient-pole stator 92, 92a with armature windings 94 (shown only in FIG. 3b) and permanent magnets 96. Because the active parts such as magnets 96 and armature windings 94 are all located on the stator 92, 92a, simple yet effective machine cooling can be easily implemented. Moreover, the three phase FSG's 18a, 18b provide rugged rotor structure, high torque density, and high efficiency. The stator 18a contains 12 segments of "U" shaped magnetic cores, between which 12 pieces of magnets 96 are inset and magnetized circumferentially such that there are north-south pole pairs. A concentrated coil 98, 98a is wound around the adjacent stator teeth with a magnet sandwiched therein. Hence, the polarity of the permanent magnet flux linkage in the coils reverses when the rotor pole aligns the alternative stator tooth that belongs to the same phase, i.e., realizing the "flux-switching" action. Due to the magnetic reluctance difference between the two pair of coils composing a phase, the resultant phase EMF waveforms are essentially sinusoidal without any additional measures. In addition, the optimal rotor pole arc is 1.4 times that of the stator teeth arc, and the resultant phase EMF waveform exhibits negligible harmonics.

The three phase FSG of the disclosed embodiments is particularly advantageous for VF, AC electric system architectures having a wide speed range. A typical speed range is 2:1 for electric systems with VF architecture, resulting in a frequency range from about 360 Hz to about 800 Hz. The three phase FSG design of the disclosed embodiment is also particularly effective at forcing its magnetic field through the D axis. It is a typical design goal for electric machines to attempt to force the magnetic fields to go in a certain direction on the D, Q axes and through certain areas of the electric machine. When operating an electric machine in generate mode, it is typical to attempt to force the magnetic field through the D axis, and this is typically accomplished by shaping the rotor iron such that it channels the magnetic field through the D axis. On the Q axis for the three phase FSG of the present disclosure, there is just air space between the rotor's north and south poles. The magnetic fields of the three phase FSG of the present disclosure do not want to move through the airspace (Q axis) and instead prefers to move through the steel sections of the rotor, which include the D axis. Thus, the three phase FSG of the present disclosure isolates the D axis from the Q axis.

Because the three phase FSG is effective at isolating the D axis from the Q axis, it improves the ability to more precisely identify the presence or absence of the magnetic field, thus creating high saliency. Therefore, the three phase FSG is effective as a position sensor. Because the three phase FSG provides clean isolation of the D and Q axes, it provides clean isolation of the presence of a magnetic field (i.e., the D axis) from the absence of a magnetic field (i.e., the Q axis). Control strategies that would enable the disclosed embodiments to be utilized as a sensor are described in U.S. Pat. No. 8,362,728, and U.S. Pat. No. 7,583,046 B2, and the entire disclosure of each patent is incorporated herein by reference.

Additional details of three phase FSG's are disclosed in A. Chen, R. Nilssen and A. Nyxveen, "Investigation of a Three-Phase Flux-Switching Permanent Magnet Machine for Downhole Applications," *Proceedings of ICEM* 2012, *Rome,* 2010, along with J. T. Chen, and Z. Zhu, "Advanced Flux-Switching Permanent Magnet Brushless Machines," in *IEEE Transactions on Magnetics, Vol* 46, *Issue* 6, June 2010. The entire disclosure of each document is specifically incorporated herein by reference.

Accordingly, it can be seen from the foregoing disclosure and the accompanying illustrations that one or more embodiments may provide some advantages. For example, the system is a three phase system, which allows for a light weight GCU because the filter is smaller in three phase systems. The system allows for better load regulation because it is a three phase system. As shown in FIGS. 3a, 3b and 4, the magnets are mounted in a stationary fashion which allows for ease of manufacture and high reliability. Additionally, unlike a PMG, the magnets do not need structural retention due to high operating speeds. Because of the stator mounting, it is easier to cool the magnets, thus providing better heat dissipation and higher efficiency. The magnets and the center line of the winding are orthogonal, resulting in less de-magnetization from the armature reaction due to the geometry. This allows for greater load capacity. As shown in FIGS. 2, 3a, 3b and 4, the windings are mounted in the orthogonal axis to the magnet. The windings are concentrated, which results in less copper loss and ease of manufacturing. The rotor only consists of electrical steel, which makes the rotor more robust than other machine types and the operating speed can be very high. The three phase FSG can be utilized as a sensor during start mode because the rotor is cogged and the stator windings are salient poles. Both features force a difference between the D and Q axis inductances and create a large magnetic saliency.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A wound field synchronous machine (WFSM) having a generate mode and a starter mode, the WFSM comprising:
   a three phase flux switching generator (FSG);
   an exciter coupled to said three phase FSG; and
   a main machine coupled to said exciter, wherein the WFSM comprises a variable input speed range and a variable frequency (VF) architecture;
   wherein said three phase FSG comprises a rotor having alternating north pole segments and south pole segments;
   wherein said rotor further comprises air spaces between said alternating north pole segments and south pole segments;
   wherein at least one direct axis of said rotor extends through at least one of said alternating north pole segments and south pole segments;
   wherein at least one quadrature axis of said rotor extends through at least one of said air spaces;
   wherein said three phase FSG directs magnetic fields primarily through said at least one direct axis, thereby substantially isolating inductance of said at least one direct axis from inductance of said at least one quadrature axis.

2. The WFSM of claim 1 operating in a generate mode wherein said three phase FSG provides excitation power for said exciter.

3. The WFSM of claim 2 wherein said exciter energizes said main machine.

4. The WFSM of claim 3 further comprising a common rotor for said three phase FSG, said exciter and said main machine.

5. The WFSM of claim 4 further comprising a rectifier coupled between said exciter and said main machine, wherein said rectifier converts AC power from said exciter to DC power for said main machine.

6. The WFSM of claim 1 further comprising:
   a rotor position sensor comprising said three phase FSG.

7. The WFSM of claim 6 wherein inductance of said at least one direct axis indicates the presence of a magnetic field and inductance of said at least one quadrature axis indicates the substantial absence of a magnetic field, thereby indicating a position of a rotor of the WFSM.

8. A wound field synchronous machine (WFSM) having a generate mode and a starter mode, the WFSM comprising:
   means for generating three phase excitation power;
   means for generating electromotive force (EMF) in response to said excitation power; and
   means for inducing a voltage in response to said EMF;
   wherein the WFSM comprises a variable frequency (VF) architecture;
   wherein a load coupled to said means for inducing draws a current;
   wherein said means for generating three phase excitation power comprises a rotor having alternating north pole segments and south pole segments;
   wherein said rotor further comprises air spaces between said alternating north pole segments and south pole segments;
   wherein at least one direct axis of said rotor extends through at least one of said alternating north pole segments and south pole segments;
   wherein at least one quadrature axis of said rotor extends through at least one of said air spaces;
   wherein said means for generating three phase excitation power directs magnetic fields primarily through said at least one direct axis, thereby substantially isolating inductance of said at least one direct axis from a inductance of said at least one quadrature axis.

9. The WFSM of claim 8 wherein said means for generating three phase excitation power comprises a three phase flux switching generator (FSG).

10. The WFSM of claim 9 wherein said means for generating EMF comprises means for converting AC power to DC power.

11. The WFSM of claim 10 wherein said means for converting comprises a rectifier.

12. The WFSM of claim 8 further comprising:
   means for sensing a position of a rotor of the WFSM;
   wherein said means for sensing directs magnetic fields primarily through said at least one direct axis, thereby substantially isolating inductance of said at least one direct axis from inductance of said at least one quadrature axis.

13. The WFSM of claim 12 wherein said direct axis inductance indicates the presence of a magnetic field and said quadrature axis inductance indicates the substantial absence of a magnetic field, thereby indicating said position of said rotor of the WFSM.

14. A method of operating a wound field synchronous machine (WFSM) having a generate mode and a starter mode, the steps comprising:
   generating, using a three phase flux switch generator (FSG), three phase excitation power;
   generating electromotive force (EMF) in response to said excitation power; and
   inducing a voltage in response to said EMF;
   wherein said three phase FSG comprises a rotor having alternating north pole segments and south pole segments;
   wherein said rotor further comprises air spaces between said alternating north pole segments and south pole segments;
   wherein at least one direct axis of said rotor extends through at least one of said alternating north pole segments and south pole segments;
   wherein at least one quadrature axis of said rotor extends through at least of said air spaces;

wherein the WFSM comprises a variable frequency (VF) architecture and directs magnetic fields primarily through said at least one direct axis, thereby substantially isolating inductance of said at least one direct axis from a inductance of said at least one quadrature axis;

wherein a load coupled to said voltage draws a current.

15. The method of claim 14 further comprising:

sensing a position of a rotor of the WFSM;

wherein said sensing step directs magnetic fields primarily through said at least one direct axis, thereby substantially isolating inductance of said at least one direct axis from inductance of said at least one quadrature axis.

16. The method of claim 15 wherein inductance of said at least one direct axis indicates the presence of a magnetic field and inductance of said at least one quadrature axis inductance indicates the substantial absence of a magnetic field, thereby indicating said position of said rotor of the WFSM.

* * * * *